United States Patent
Penke et al.

(10) Patent No.: US 8,086,047 B2
(45) Date of Patent: Dec. 27, 2011

(54) METHOD AND SYSTEM FOR IMAGE EVALUATION DATA ANALYSIS

(75) Inventors: Mark S. Penke, West Henrietta, NY (US); Donald A. Brown, Honeoye Falls, NY (US); Sarah E. Campbell, Rochester, NY (US); Keith S. Karn, Avon, NY (US); Cornell Juliano, Churchville, NY (US); David M. Parsons, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 1108 days.

(21) Appl. No.: 11/724,008

(22) Filed: Mar. 14, 2007

(65) Prior Publication Data

US 2008/0226178 A1 Sep. 18, 2008

(51) Int. Cl.
*G06K 9/62* (2006.01)
(52) U.S. Cl. ........................................ 382/225
(58) Field of Classification Search ........................ None
See application file for complete search history.

(56) References Cited

U.S. PATENT DOCUMENTS

| | | | |
|---|---|---|---|
| 6,937,913 B2 | 8/2005 | Nishikawa et al. | |
| 7,016,882 B2 | 3/2006 | Afeyan et al. | |
| 2002/0002482 A1* | 1/2002 | Thomas | 705/10 |
| 2002/0164070 A1* | 11/2002 | Kuhner et al. | 382/159 |
| 2005/0169527 A1* | 8/2005 | Longe et al. | 382/177 |
| 2005/0261953 A1 | 11/2005 | Malek et al. | |
| 2006/0116930 A1 | 6/2006 | Goldstein | |

* cited by examiner

*Primary Examiner* — Daniel Mariam
*Assistant Examiner* — Elisa Rice
(74) *Attorney, Agent, or Firm* — MH2 Technology Law Group LLP

(57) ABSTRACT

A method is provided for operating a computer to analyze image evaluation data from electronic survey respondents to evaluate preferences related to two dimensional and three dimensional images. Data files, which include designated area data, image attributes, and survey respondent opinions for one or more images in an electronic survey, are received. A graphical user interface permits an operator to reformat the designated area data and set analysis parameters. Cluster analysis is performed on the data files to reduce the dimensionality of the designated area data and to classify areas of the survey images that generate positive and negative responses. The analysis produces coordinate data to map cluster classifications and for construction of a heat map. In association with descriptive statistical analysis, cluster score evaluation is performed to identify the clusters of interest. Respondent comments and results from the statistical analysis are linked to clusters of interest.

23 Claims, 5 Drawing Sheets

METHOD AND SYSTEM FOR IMAGE EVALUATION DATA ANALYSIS

CROSS-REFERENCE TO RELATED APPLICATIONS

The following co-pending applications, U.S. application Ser. No. 11/717,856, filed Mar. 14, 2007, titled "Graphical User Interface for Gathering Image Evaluation Information", and U.S. application Ser. No. 11/717,855, filed Mar. 14, 2007, titled "Graphical User Interface for Presenting Image Evaluation Information", are assigned to the same assignee of the present application. The entire disclosures of these co-pending applications are totally incorporated herein by reference in their entireties.

BACKGROUND AND SUMMARY

This disclosure relates generally to computer software and systems, particularly business application software and systems, and more particularly graphical user interfaces for the evaluation of preferences related to two-dimensional and three-dimensional images.

Product manufacturers operating globally utilize market research studies to obtain direct feedback about customer needs, values, and buying trends. For the purposes of such organizations, it is critical that these design considerations reflect the perspectives of all of a corporation's primary markets. Market research studies have taken several forms in an effort to identify product features that would be useful to and preferred by the widest customer population. For example, such studies have included focus groups, analysis of calls to customer service, interviews with industry experts, questionnaires/surveys, product testing, ethnographic techniques, among others. In one form, surveys containing images of proposed design concepts are presented to respondents in a hard copy format to solicit comments. Respondents comment on the various images by circling areas that they like or dislike as regarded such items as form factors or visual color changes and add written comments explaining their perspectives. This feedback is then collected, and the results are collated manually. Although much useful data may be gathered using this method, it presents several significant problems. The most serious include high analysis costs, difficulty in identifying meaningful patterns, limited survey distribution, and the extended amount of time necessary to complete the test itself.

Computer based survey tools have also been utilized to obtain customer data. Although computer surveys offered the benefits of electronic data collection and wider survey distribution, there was no means for respondents to physically draw and write on pages. Considering the visual and actual complexity of business products such as copiers, printers, and multi-function devices, useful design feedback and insights must necessarily be specific.

While these tools are useful, the product design process requires a high degree of specificity in obtaining actionable information relative to product appearance and architecture, and it is necessary that it include users worldwide. The survey respondent needs the ability to identify specific areas of images and to provide comments relative to those areas. No existing survey applications permit respondents to draw on images to specify areas of interest and then comment on those areas. Nor are existing tools able to compile and analyze such data, in an accurate and easily comprehended manner.

To meet the needs of development of visually and operationally complex business products being marketed internationally, it would be desirable to have a market research tool that provides electronic distribution, worldwide participation, data security, ease of use, enabling of the positive or negative designation of any area of an image, enabling of association of specific comments to designated areas, quick, accurate, and cost effective analysis of the data, and visual presentation of the results in a clear, meaningful, and useful way.

All U.S. patents and published U.S. patent applications cited herein are fully incorporated by reference and are included only for purposes of adding alternative embodiments and are not intended to define or narrow the claim terms as set forth herein. The following patents or publications are noted.

U.S. Pat. No. 6,937,913 to Nishikawa et al. ("Product Design Process and Product Design Apparatus") describes a product design process and apparatus for defining an optimal product concept capable of conveying customer satisfaction. The process includes analysis of wants and needs information, and, based on the analysis, weighting is carried out with respect to evaluation indices which have been previously stored in a storage device. The wants and needs information includes quantitative measures of the degree to which the user is likely to perceive a benefit latent in the product under consideration and inherent in the wants and needs information. An evaluation index is selected from among a plurality of weighted evaluation indices and a product design concept for which the primary evaluation index selected is a maximum or minimum is defined.

U.S. Pat. No. 7,016,882 to Afeyan et al. ("Method and Apparatus for Evolutionary Design") describes generating and presenting, typically electronically, a number of design alternatives to persons who are participating in a design, selection, or market research exercise. The respondents transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles.

U.S. Published Patent Application No. 2005/0261953 to Malek et al. ("Determining Design Preferences of a Group") teaches a method for generating and presenting, typically electronically, generations of design alternatives to persons participating in the design, selection, or market research exercise. The respondents transmit data indicative of their preferences among or between the presented design alternatives. Some of the data is used to conduct a conjoint analysis or non-convergent exercise to investigate the drivers of the preferences of the group or its members, and at least a portion are used to derive follow-on generations of design alternatives or proposals. The follow-on designs are preferably generated through the use of an evolutionary or genetic computer program, influenced by the respondents' preferences. The process results in the generation of one or more preferred product forms and information permitting a better understanding of what attributes of the product influence the preferences of the test group members.

U.S. Published Patent Application No. 2005/0261953 to Goldstein ("Computer System and Method for Development and Marketing of Consumer Products") describes a computer-implemented method for the design and/or marketing of one or more consumer products based on an identified Icon includes capturing and storing in memory preferences of the Icon in accordance with at least one systematic survey of some of the preferences. One or more designs are created for a consumer product or for a space or scheme for a marketing promotion. The consumer product or space/scheme is stored in memory. The preferences may include aspects of a product or space and information regarding the background of the Icon.

The disclosed embodiments provide examples of improved solutions to the problems noted in the above Background discussion and the art cited therein. There is shown in these examples an improved method for operating a computer to analyze image evaluation data from electronic survey respondents to evaluate preferences related to two dimensional and three dimensional images. Data files, which include designated area data, image attributes, and survey respondent opinions for one or more images in an electronic survey, are received. A graphical user interface permits an operator to reformat the designated area data and set analysis parameters. Cluster analysis is performed on the data files to reduce the dimensionality of the designated area data and to classify areas of the survey images that generate positive and negative responses. The analysis produces coordinate data to map cluster classifications and for construction of a heat map. In association with descriptive statistical analysis, cluster score evaluation is performed to identify the clusters of interest. Respondent comments and results from the statistical analysis are linked to clusters of interest. The analysis results are saved for processing by a data viewing apparatus.

In an alternate embodiment there is disclosed a system for operating a computer to analyze image evaluation data from electronic survey respondents to evaluate preferences related to two dimensional and three dimensional images. The system provides a graphical user interface that enables an operator to reformat designated area data and set analysis parameters for received data files. The received data files include designated area data, image attributes, and survey respondent opinions for at least one image in an electronic survey. The system performs cluster analysis on the data files to reduce the dimensionality of the designated area data and to classify areas of the survey images that generate positive and negative responses. Coordinate data is produced to map cluster classifications onto the survey images and for construction of a heat map of the designated area data. Statistical analysis is performed on the data files and cluster score evaluation is performed to identify clusters of interest. The system links respondent comments and results from the statistical analysis to the clusters of interest and saves the results in a machine readable file.

In yet another embodiment there is disclosed a computer-readable storage medium having computer readable program code embodied in the medium which, when the program code is executed by a computer, causes the computer to perform method steps for operating a computer to analyze image evaluation data from electronic survey respondents to evaluate preferences related to two dimensional and three dimensional images. Data files, which include designated area data, image attributes, and survey respondent opinions for one or more images in an electronic survey, are received. A graphical user interface permits an operator to reformat the designated area data and set analysis parameters. Cluster analysis is performed on the data files to reduce the dimensionality of the designated area data and to classify areas of the survey images that generate positive and negative responses. The analysis produces coordinate data to map cluster classifications and for construction of a heat map. In association with descriptive statistical analysis, cluster score evaluation is performed to identify the clusters of interest. Respondent comments and results from the statistical analysis are linked to clusters of interest. The analysis results are saved for processing by a data viewing apparatus.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
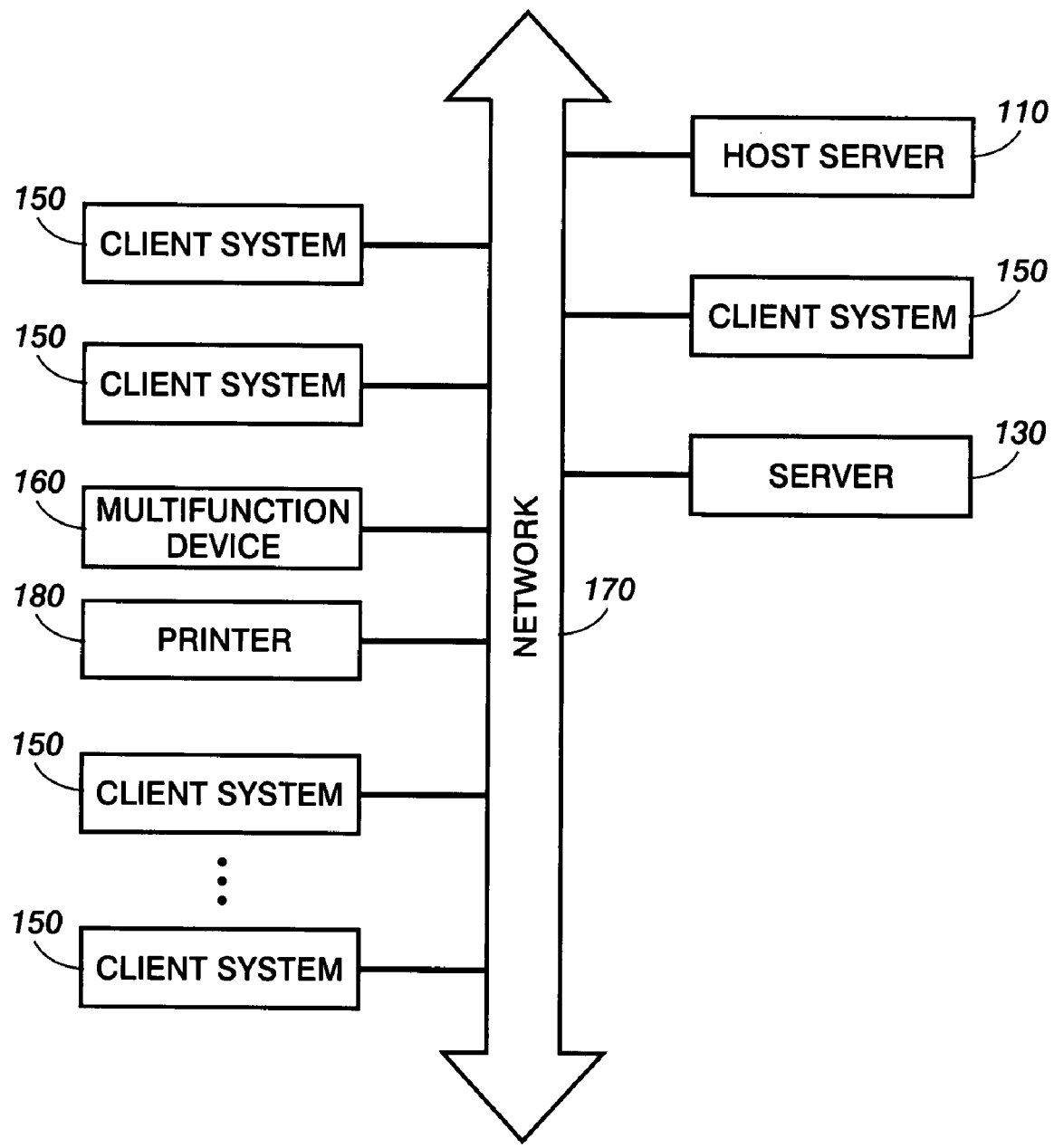
FIG. 1 is a block diagram of the operating environment for a system that provides computer operated product design evaluation.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The product design evaluation system described herein presents proposed designs to survey respondents, and their feedback is collected via, for example, individual personal computers connected in a network such as an intranet, an extranet, or the internet. It is possible to control the interpersonal dynamics among the respondents. It is also possible to isolate them completely from one another, so that no one of them is aware of the preferences expressed by the other respondents. It is also possible to allow selective levels of information to be shared among the respondents, to initiate a real or virtual group discussion. Furthermore, by connecting respondents via a computer network, it is possible to assemble a group of respondents that are located in very different geographical locales. Time management is also facilitated, as the need to bring together all respondents at the same time is reduced by seamlessly integrating data that is received at different points in time.

For the purposes herein, "products" is intended to be a generic term referring to goods, such as objects intended to be mass produced, and modularized goods such as personal computers or printing devices which comprise a plurality of interchangeable parts suitable for mass customization. "Attributes" of a product, as used herein, is intended to refer to the structural, functional, stylistic, or economic features of the product, and may include such things as cost, color or color combination, size, shape, style, pattern, length, weight, content feature, option, choice of material, etc. The product attributes may be aesthetic or functional. A given product has a series of possible attributes that are combined using the method of the disclosure herein to develop a design. Different types of objects of the design or selection may have different groups of possible attributes. Thus, for example, designs for an aesthetically pleasing exterior appearance of a printing device would have attributes such as material (e.g., plastic or metal), distribution of materials (e.g., plastic sides with metal features), texture, color, color combination, length, width, size of controls, shape of controls, location of controls, color of controls, position of status lights, etc. The term "attribute" denotes both elements that are absolute, in the sense that they are either present in the product or not, and relative, in the sense that an attribute can have many values, or be broken down into many subtypes. An example of the former is the presence or absence of a monitor on a printing device. An example of the latter is the location or size of controls on a printing device.

While for the purposes of explanation the method and system will be described as functioning within a network including various printing and communication devices, it will be appreciated by those skilled in the art that the system and method for product design evaluation may be beneficially utilized in any communication environment. All such variations and modifications are fully contemplated by the scope of the specification and claims herein.

Various computing environments may incorporate capabilities for supporting document communication capabilities utilizing facsimile controllers and equipment on which the facsimile controller may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the block diagram illustrates an example embodiment of a product design evaluation system in a networked environment. The network environment may contain client systems 150 through which users can access printers 180, multifunction device 160 and other devices connected to the network. The server 130 is a shared/private document repository. It also provides storage for the print server, containing, for example, historical printing information, logs, etc. for the printers controlled by the print server. Host server 110 hosts the modules of the product design evaluation system, including the input module, analysis module, and viewing module, which are discussed in more detail herein below with respect to FIG. 2.

All these main components are coupled together via network 170. The system and method herein are not limited to a particular type of network system 170 and may include a local-area network (LAN) such as an Ethernet network or a wide area network (WAN) such as the Internet or the World Wide Web. Client systems 150 can be connected to the network 170 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, Net BIOS, Ethernet, RS232, and direct asynchronous connections). For example, the network 170 may be a corporate intranet connecting decision makers in an organization to a centralized decision engine, or it may be a secure extranet or virtual private network connecting different entities such as a company's suppliers or consultants to the company's design engine. Such networking environments are commonplace in offices, enterprise-wide computer networks, intranets and the Internet. Those skilled in the art will appreciate that the principles of the system and method described herein can be applied to virtually any network system without departing from the scope of the claims and specification.

The client systems 150 may be any personal computer, Windows-based terminal, network computer, wireless device, information appliance, X-device, workstation, minicomputer, mainframe computer, personal digital assistant, or other computing device and typically have a processor, random-access memory, read-only memory, and one or more storage devices, such as a hard drive, CD-ROM, DVD, diskette, etc. In the embodiments herein, client systems 150 may use any one of a number of windows-oriented operating systems. The processor is coupled to an output device, such as a display device, input devices, such as a keyboard, mouse, or pointer, and communication circuitry. The output device, for example, a monitor, displays information for viewing by a user of personal computer 150 and an input device is used to control a screen pointer provided by the graphical user interface of the operating system. The output device may comprise a computer, a television, or other electronic device coupled wirelessly or via wires to a server. The system and method herein are not limited to any particular output or input device.

Multifunction device 160 may be any device capable of scanning and transmitting image material, printing, copying, or transmitting facsimile images. Operation of multifunction device 160 is controlled from a user interface, which enables a user to select the function to be performed as well as enter information required by the device to perform an operation. Typically buttons or a keypad are utilized to enter information and select functionality, but a touch screen or any other means known in the art may be utilized. Multifunction device 160 communicates with print server 130 as well as host server 110 and client systems 150.

Figure 2:
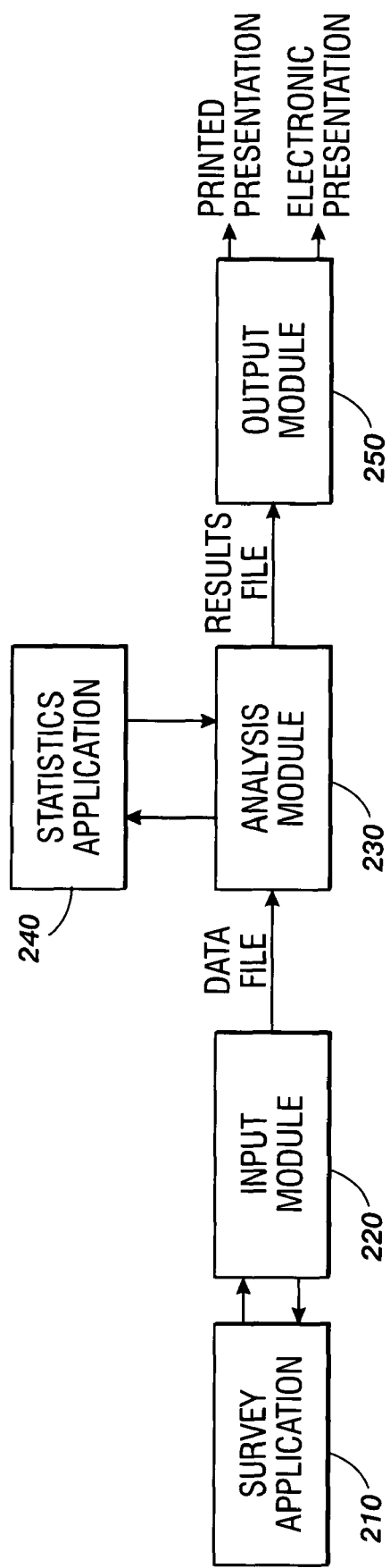
FIG. 2 is a block diagram of one embodiment of a system that provides computer operated product design evaluation.

Turning now to FIG. 2, one example embodiment of the system for product design evaluation is described. The product design evaluation system utilizes a set of uniquely designed software modules: an input module 220 to gather respondents' input, an analysis module 230 to process the resulting data from the input module, and an output module 250 for viewing the data. Input module 220 operates in conjunction with a commercially available electronic survey application 210 to permit survey respondents to provide input about selected areas of images. Any of various online survey tools could be utilized, including Vantage Point, Perseus, WebSurveyor, Survey-Monkey, iSalient, Key Survey, and Zoomerang, among others. In operation, the Input Module pulls variables that are set in the standard survey interface. These variables include, for example, instructional text, positive and negative area labels, the attributes presented for each area, the maximum number area designations allowed, and the image. These variables are used to populate the custom template.

After a survey respondent inputs data, the x and y and width and height coordinates, selected attributes and text comments for each area designation are returned to the survey tool and placed in a data file. Input module 220 enables respondents to use a custom drawing tool to designate areas of interest on digital images of three dimensional product concepts (or any image) that are presented in two-dimensional space within an electronic survey. The "designated area" data is comprised of the X and Y coordinates and width and height of the areas of images that respondents identify. Additionally, the input module 220 permits respondents to provide opinions (for example, ratings and/or comments) about the designated areas they identify. This information is saved in a machine-readable file for analysis. One embodiment of input module 220 is described more fully in co-pending U.S. application Ser. No. 11/717,896, filed Mar. 14, 2007, titled "Graphical User Interface for Gathering Image Evaluation Information".

Analysis module 230 receives the machine-readable file (Data File 1) from input module 220 and enables an automated analysis of the "designated area" data collected by the input module. Specifically, it utilizes multivariate exploratory techniques to analyze the coordinates of the "designated area" data and employs a unique scoring algorithm to identify the most significant areas of interest. It also enables "what if" scenarios to allow the data to be evaluated in multiple ways by changing parameter settings and links respondent comments and ratings to the significant areas of interest. This information is saved in a machine-readable file for analysis (Results File 1). Statistics application 240 communicates with analysis module 230 and performs cluster analysis of the data as specified by analysis module 230. For example, the analysis module passes a block of data plus the parameters set in the module to the statistics application, for example R, which determines the cluster assignments and heat mapping and sends the cluster and heat mapping results back to the analysis module. For each image, the analysis module calculates the total number of respondents, positive and negative cluster scores, the number of positive and negative areas designated, the number of positive and negative comments, and the number of positive and negative attributes. For each cluster, the analysis module calculates a cluster score, the number of respondents, number of areas, number of areas with attributes, number of areas with comments, and the percentage of areas with each attribute checked. The analysis module compiles the data blocks, associates comments with clusters, converts the data to XML format, and writes the final output files. Additional exploratory statistical methods may be added, such as multidimensional scaling, principal component analysis, factor analysis, correspondence analysis, and other multidimensional techniques.

Output module 250 enables an operator to easily view and understand the analysis of the data. It receives results files from analysis module 230 and transforms the computational results into a display that is superimposed over the original product images, thus providing an easily understood interpretation of the data. A top-level summary of the data is provided to enable the operator to compare respondent responses to all images that were evaluated. Additionally, it provides detailed results of each image that was evaluated, displaying the most important elements of the original images based on the original respondent selections along with associated comments and ratings. The data may be viewed, filtered by parameters like positive feedback, negative feedback, country, and type of respondent. Output module 250 also provides a variety of ways to select and adjust the appearance of the display of the data. The output may be viewed in the form of either a printed or electronic presentation. One embodiment of an output module is described in more detail in copending U.S. application Ser. No. 11/717,855, filed Mar. 14, 2007, titled "Graphical User Interface for Presenting Image Evaluation Information". While the product design evaluation system consists of three modules that are designed to work with each other, each module is a separate entity and may be used independently of the other modules for other applications.

The particular methods performed by the product design evaluation system comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 3:
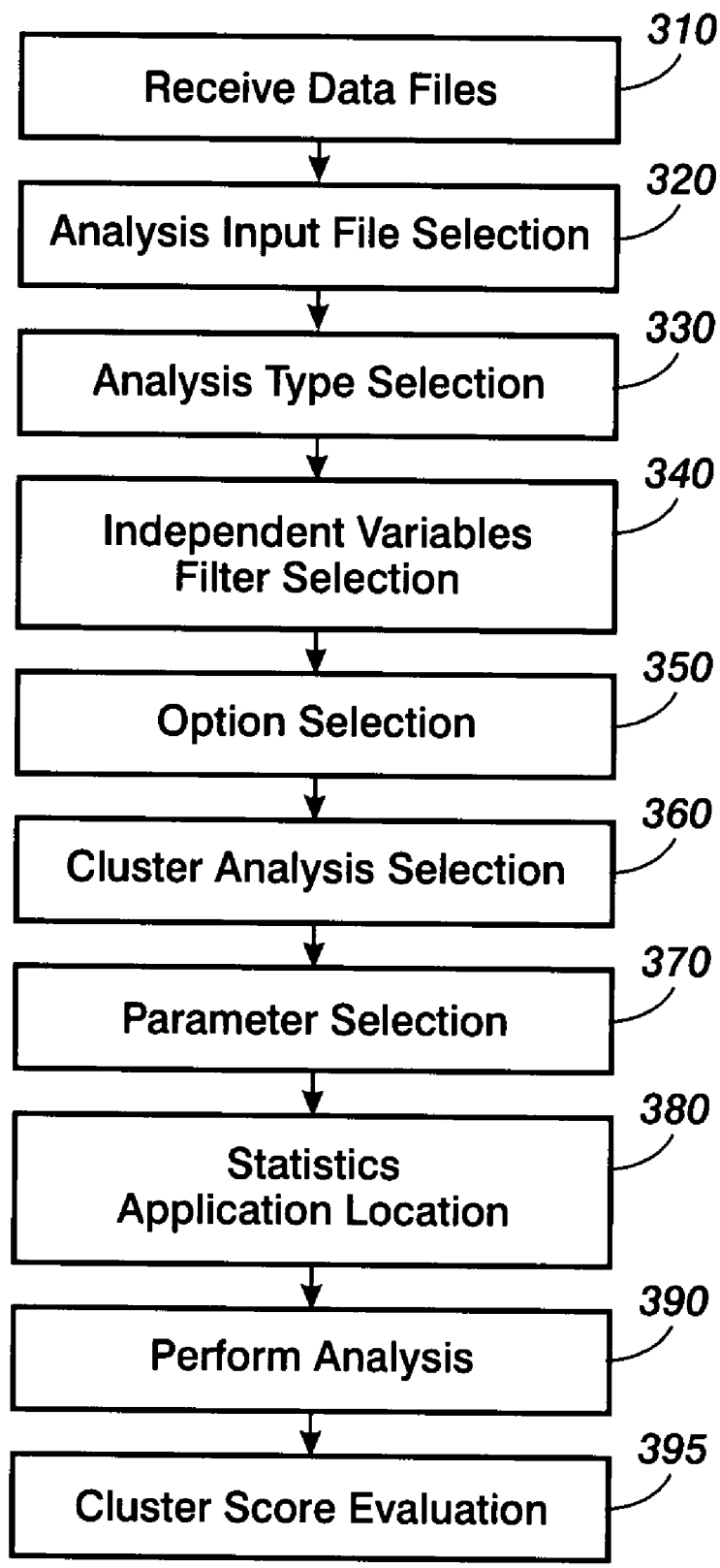
FIG. 3 is a flow diagram that illustrates an embodiment of the method of operation of the analysis module of the product design evaluation system.
Figure 4:
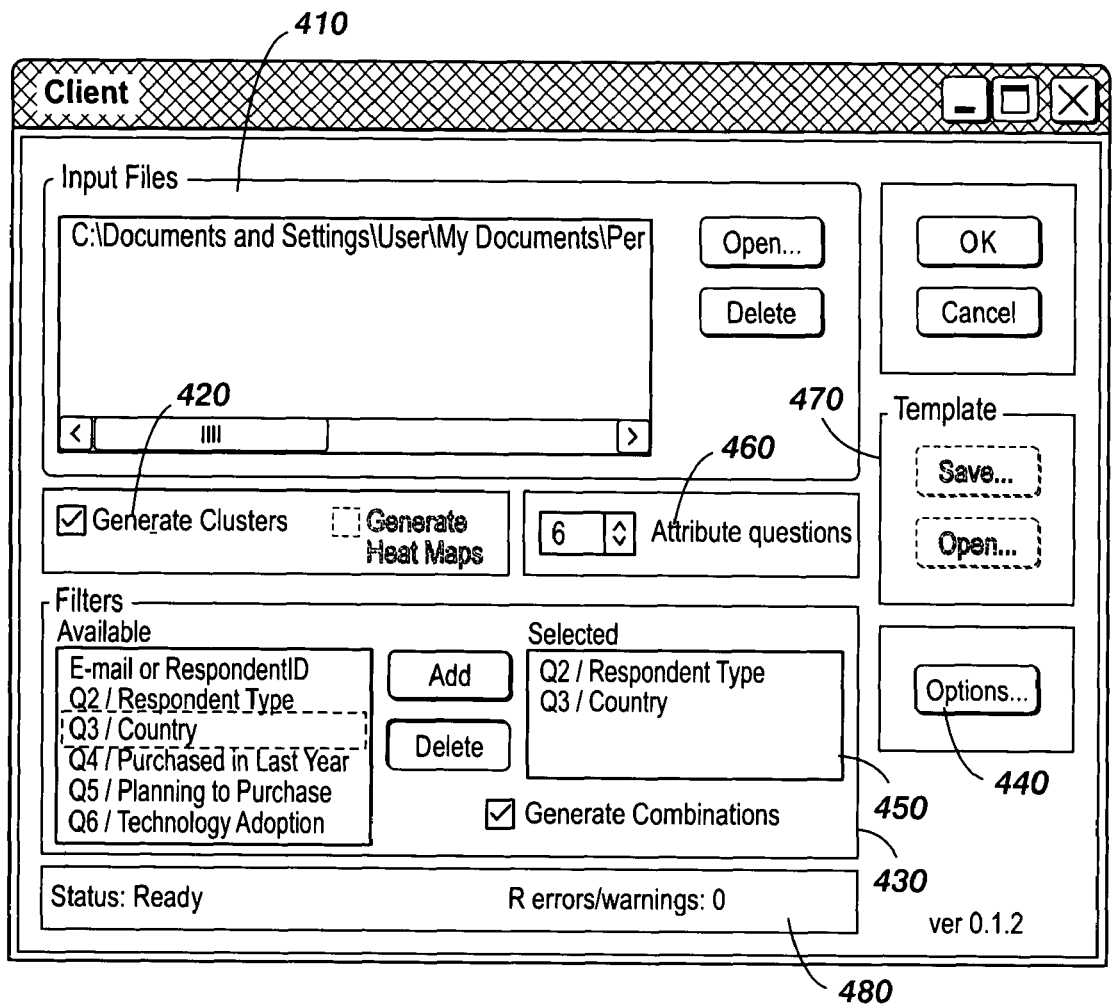
FIG. 4 is an example embodiment of a dynamic graphic display for presenting the analysis module capability.
Figure 5:
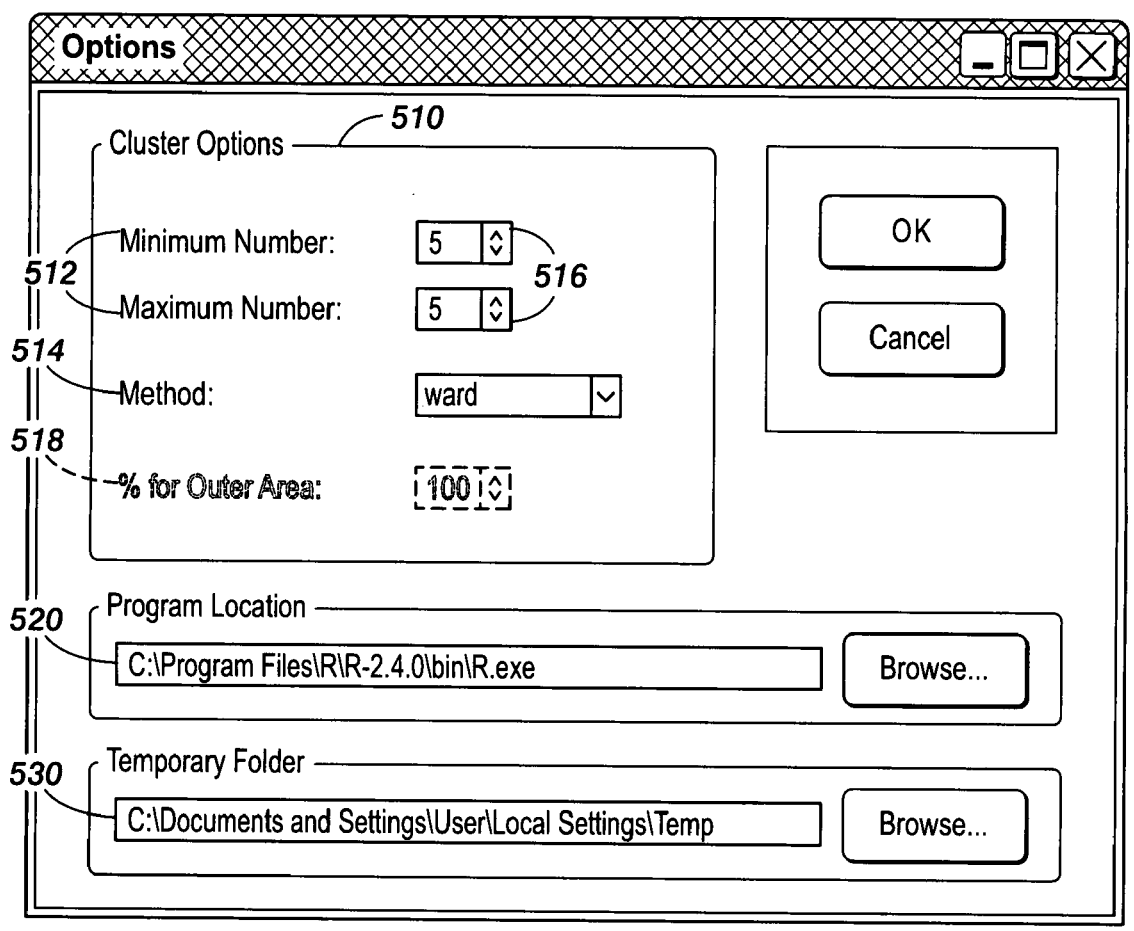
FIG. 5 is an example embodiment of a dynamic graphic display for selecting analysis options.

Turning now to FIGS. 3 through 5, there is shown operation of one example embodiment of the method for data analysis in the product design evaluation system. At 310 the analysis module receives data files, which include designated area data with associated participant opinions, ratings, and comments. The analysis module presents the analysis graphical user interface, illustrated in FIG. 4, that permits an operator to set the type of analysis and to inform the module where the data is located and how it is to be organized. At 320 the operator selects analysis input files as illustrated with item 410 on the user interface of FIG. 4. The analysis input files are selected from the survey data files associated with some or all of the images that appeared in the particular survey in question. For example, for a survey that includes four images, respondents are asked to use the input tool to designate areas on all four of those images. The data files from the survey tool are reformatted and split into four separate files. These files become the input files for the analysis module and each file contains all designated area data for one image. The operator also selects the analysis type at 330, illustrated on FIG. 4 at 420. In this embodiment, the operator may select either cluster generation or heat map generation, but other forms of analysis known in the art may be available, all of which are encompassed by the scope of the specification and claims herein. The heat map is generated by displaying the centers of all designated areas on an image. Additional exploratory statistical methods may employed, such as multidimensional scaling, principal component analysis, factor analysis, correspondence analysis, and other multidimensional techniques.

Returning to FIG. 3, an operator selects the filter to be applied to the independent variables at 340, illustrated on the graphical user interface of FIG. 4 at 430. Item 430 provides a list of available filters, including country, respondent type, purchased in last year, planning to purchase, and technology adoption, among other possible options. As will be appreciated by those skilled in the art, filters are dependent on the specific survey and data captured about respondents. Other possible filters may include, for example, age, gender, professional role, market segment, color or mono equipment use, among others, all of which are contemplated by the scope of the specification and claims herein. The filters are selected using the Add and Delete buttons; the selected filters are displayed at 450. The user interface provides for the selection of multiple filters or a single filter. In the example embodiment, several filters have been selected (respondent type and country) and the generate filter combinations box has been selected.

Once an analysis has been set up (input files, filters, number of attributes, etc. selected) the Save template option 470 allows that setup to be saved. If an operator desires to run the same analysis with the same filters and attributes etc, the template may be opened rather than re-specifying all of the selections again. When the Save button in template option 470 is selected, a file structure dialog opens, providing for naming of the template file prior to saving the file. When Open is selected from template option 470, a file structure dialog opens, the operator finds and selects the template file desired, and selects Open. After Open is selected, the dialog window closes and the template information populates the analysis module window. R errors/warnings entry 480 tracks the number of errors encountered, if any, in the R workspace, which is the statistics program being used by the analysis module. If there are errors listed, the operator reviews the error logs to determine what the error was.

Returning to FIG. 3, the operator may select analysis options at 350. Options selection capability is illustrated on the user interface of FIG. 4 at 440. When the options button 440 is selected, the user interface displays the Options window illustrated in FIG. 5. At 510, cluster analysis options may be specified by the operator. These include the type of cluster analysis to be used and the parameters stipulating the number of analyses to be conducted. The types of cluster analysis are displayed at 514 in a drop down menu, from which the operator may select a cluster analysis method by highlighting an individual item. This corresponds to cluster analysis selection at 360 in FIG. 3 and enables the use of multivariate exploratory techniques to analyze the coordinates of the designated area data received at 310. The operator also may select parameters at 370. By varying these settings, the operator is able to evaluate the data in multiple ways. In FIG. 5, parameter selection options are displayed at 512, as the maximum and minimum number of analyses to be conducted. Both the maximum and minimum may be selected through use of the increase and decrease arrow buttons in items 516.

When results of the cluster analysis are displayed in the output module there are three pieces of information that may be displayed for each cluster—the centroid, average size of designated area in the cluster and the maximum size of any area in the cluster. A selection of the "% for outer area" option 518 in the analysis module designates what percentage of the maximum area should be displayed as the outer box for each cluster in the output module. The location of the statistics program is selected at 520. The operator may browse among the various statistics applications available for performing the survey data analysis and highlight the desired application, which is presented as the program location 520. This corresponds to statistics application location 380 in FIG. 3.

Returning to FIG. 5, item 530 provides temporary folder location options, which are selectable from the corresponding browse button. The analysis process produces several intermediate files before the final data files, which can be uploaded into the output module, are produced. These files are placed in and are accessible in the temporary folder 530. Any error logs that are generated during the analyses are located here as well. When the options selection is complete, the operator indicates completion by selection of the OK button on the options window. Upon selection of the OK button on the analysis tool graphical user interface, analysis is initiated at 390 in FIG. 3. As part of the statistical analysis, at 395, cluster score evaluation is performed.

Because classification methods such as Cluster Analysis do not provide a good measure for evaluation of the importance of a cluster, presented herein is an algorithm for providing such a score. In this approach, the greater the value of the score, the more noteworthy the image or cluster. The score is based on the assumption that importance is a function of both the number of areas in a cluster and the proportion of respondents who contributed to the cluster. This score does not take into account attributes or comments. The cluster score evaluation requires three input variables: the number of unique respondents who contributed an area to a cluster (UR), the total number of survey respondents (SR), and the total number of selected areas that comprise a cluster (SA). With this information, the score is determined as:

$$\text{Score} = \frac{UR}{SR}(SA)$$

For example, with 10 unique respondents (UR) among 25 individuals participating in the survey (SR) and 100 areas in the cluster (SA), the resulting score would be 40. The results from evaluation of cluster importance are used to identify the most significant areas of interest in the products surveyed. This information is linked to respondent comments and ratings and is stored in a machine-readable file for further review.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for operating a computer to analyze image evaluation data from electronic survey respondents to evaluate preferences related to two dimensional and three dimensional images, the method comprising:
   receiving data files, wherein said data files include designated area data, image attributes, and opinions of a plurality of survey respondents for one or more survey images in an electronic survey, wherein the designated area data corresponds to designated areas in one or more of the survey images;
   providing a user interface to permit an operator to reformat said designated area data and set analysis parameters;
   performing cluster analysis to said data files to reduce the dimensionality of said designated area data and to classify areas of the survey images that generate positive and negative responses;

producing coordinate data to map cluster classifications onto the survey images;

producing coordinate data for construction of a heat map of said designated area data;

performing descriptive statistical analysis to said data files;

identifying clusters of interest based on the designated areas;

assigning a cluster score to at least one cluster of the clusters of interest, wherein the cluster score is generated based on a proportion of the plurality of survey respondents that designated at least one area of the designated areas associated with the at least one cluster;

linking the opinions corresponding to the designated areas and results from said descriptive statistical analysis to said clusters of interest; and saving analysis results for processing by a viewing means.

2. The method according to claim 1, wherein said user interface provides capability for analysis input file selection, wherein an operator selects at least one survey data file associated with at least one image presented in said electronic survey.

3. The method according to claim 1, wherein said user interface provides capability for analysis type selection.

4. The method according to claim 1, wherein said user interface provides capability for selecting at least one filter, wherein said at least one filter is dependent on characteristics of said at least one image presented in said electronic survey.

5. The method according to claim 1, wherein said user interface provides options for structuring cluster analysis.

6. The method according to claim 1, wherein said user interface provides a listing of available statistics applications for performing said cluster analysis.

7. The method according to claim 3, wherein said analysis type includes either cluster generation or heat map generation.

8. The method according to claim 4, wherein said at least one filter is further dependent on data captured about said survey respondents.

9. The method according to claim 4, wherein said at least one filter includes at least one member selected from the group comprising country, year of purchase, purchase plans, technology adoption, market segment, and color or monotone equipment use.

10. The method according to claim 8, wherein said at least one filter includes at least one member selected from the group comprising respondent type, age, gender, and professional role.

11. The method according to claim 1, wherein said user interface further comprises providing at least one save template option, wherein said save template option enables an operator to perform additional analyses with prestructured analysis characteristics, wherein said characteristics include at least one member from the group comprising input file identification, at least one filter, and number of attributes.

12. The method according to claim 5, wherein said analysis options include at least one member selected from the group comprising types of cluster analysis and parameters stipulating the number of analyses to be conducted.

13. The method according to claim 5, wherein said options for structuring cluster analysis include a designation for the percentage of the maximum area to be displayed as the outer box for each cluster in an analysis results report.

14. A system for operating a computer to analyze image evaluation data from electronic survey respondents to evaluate preferences related to two dimensional and three dimensional images, the system comprising:

means for receiving data files, wherein said data files include designated area data, image attributes, and opinions of a plurality of survey respondents for one or more survey images in an electronic survey, wherein the designated area data corresponds to designated areas in one or more of the survey images;

means for providing a user interface to permit an operator to reformat said designated area data and set analysis parameters;

means for performing cluster analysis to said data files to reduce the dimensionality of said designated area data and to classify areas of the survey images that generate positive and negative responses;

means for producing coordinate data to map cluster classifications onto the survey images;

means for producing coordinate data for construction of a heat map of said designated area data;

means for performing descriptive statistical analysis to said data files;

means for identifying clusters of interest based on the designated areas;

means for assigning a cluster score to at least one cluster of the clusters of interest, wherein the cluster score is generated based on a proportion of the plurality of survey respondents that designated at least one area of the designated areas associated with the at least one cluster;

means for linking the opinions corresponding to the designated areas and results from said descriptive statistical analysis to said clusters of interest; and means for saving analysis results for processing by a viewing means.

15. The system according to claim 14, wherein said user interface provides capability for analysis input file selection, wherein an operator selects at least one survey data file associated with at least one image presented in said electronic survey.

16. The system according to claim 14, wherein said user interface provides capability for analysis type selection.

17. The system according to claim 14, wherein said user interface provides capability for selecting at least one filter, wherein said at least one filter is dependent on characteristics of said at least one image presented in said electronic survey.

18. The system according to claim 14, wherein said user interface provides a listing of available statistics applications for performing said cluster analysis.

19. The system according to claim 16, wherein said analysis type includes either cluster generation or heat map generation.

20. The system according to claim 14, wherein said user interface further comprises providing at least one save template option, wherein said save template option enables an operator to perform additional analyses with prestructured analysis characteristics, wherein said characteristics include at least one member from the group comprising input file identification, at least one filter, and number of attributes.

21. The system according to claim 14, wherein said user interface provides options for structuring cluster analysis.

22. The system according to claim 21, wherein said options for structuring cluster analysis include at least one member selected from the group comprising types of cluster analysis and parameters stipulating the number of analyses to be conducted.

23. A non-transitory computer-readable storage medium having computer readable program code embodied in said medium which, when said program code is executed by a computer causes said computer to perform method steps for analyzing image evaluation data from electronic survey respondents to evaluate preferences related to two dimensional and three dimensional images, the method comprising:

receiving data files, wherein said data files include designated area data, image attributes, and opinions of a plurality of survey respondents for one or more survey images in an electronic survey, wherein the designated area data corresponds to designated areas in one or more of the survey images;

providing a user interface to permit an operator to reformat said designated area data and set analysis parameters;

performing cluster analysis to said data files to reduce the dimensionality of said designated area data and to classify areas of the survey images that generate positive and negative responses;

producing coordinate data to map cluster classifications onto the survey images;

producing coordinate data for construction of a heat map of said designated area data;

performing descriptive statistical analysis to said data files;

identifying clusters of interest based on the designated areas;

assigning a cluster score to at least one cluster of the clusters of interest, wherein the cluster score is generated based on a proportion of the plurality of survey respondents that designated at least one area of the designated areas associated with the at least one cluster;

linking the opinions corresponding to the designated areas and results from said descriptive statistical analysis to said clusters of interest; and saving analysis results for processing by a viewing means.

* * * * *